F. M. BARNEY.
PHOTOGRAPHIC VIEW FINDER.
APPLICATION FILED SEPT. 25, 1914. RENEWED MAY 31, 1919.

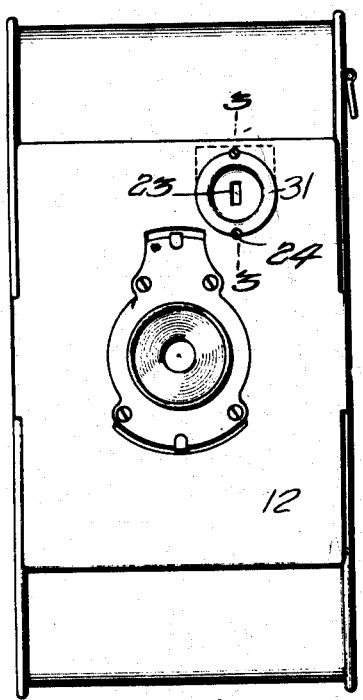
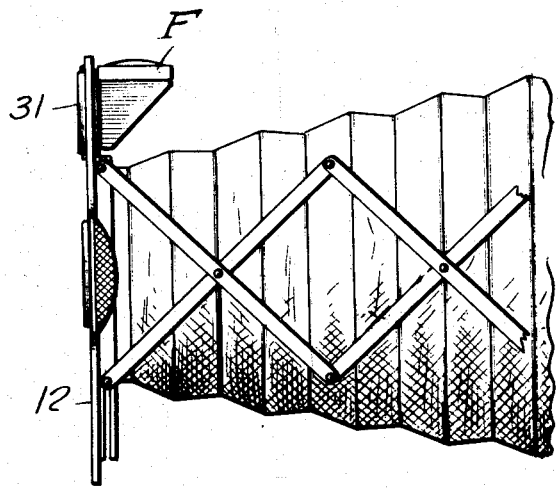
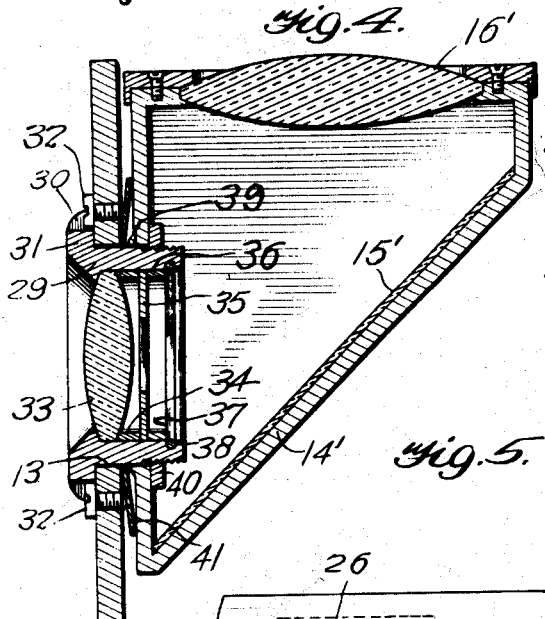
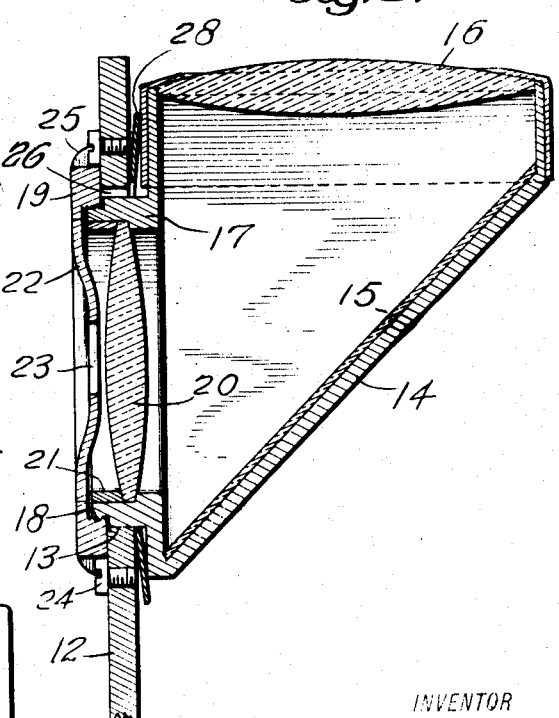
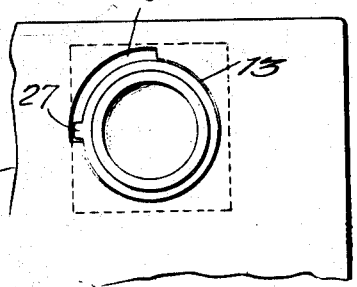

1,370,776.

Patented Mar. 8, 1921.
2 SHEETS—SHEET 2.

WITNESSES
E. M. Callaghan
John Cook

INVENTOR
FINIS M. BARNEY
BY Munn & Co.
ATTORNEYS

UNITED STATES PATENT OFFICE.

FINIS MORRISON BARNEY, OF ELM CREEK, NEBRASKA.

PHOTOGRAPHIC VIEW-FINDER.

1,370,776.

Specification of Letters Patent.

Patented Mar. 8, 1921.

Application filed September 25, 1914, Serial No. 863,476. Renewed May 31, 1919. Serial No. 301,119.

*To all whom it may concern:*

Be it known that I, FINIS M. BARNEY, a citizen of the United States, and a resident of Elm Creek, in the county of Buffalo and State of Nebraska, have made certain new and useful Improvements in Photographic View-Finders, of which the following is a specification.

This invention relates to view finders, for cameras and has for its object to provide novel and efficient means for aiding the operator in properly and symmetrically positioning the view or picture upon the sensitized plate or film.

A further object is to provide a view finder for cameras, taking other than square pictures, in which the visible field presented by the view finder will correspond as regard to shape, position and proportion with the view impressed upon the plate or film.

A further object is to provide a disk with a rectangular aperture extending therethrough positioned at the focus of the eye lens so as to intercept, limit, and sharply define the picture field and so arranged that although the finder be partially rotated the picture field will remain stationary with relation to the picture reproducing portions of the camera, their longitudinal axes occupying fixed analogous positions.

With the foregoing and other objects in view which will appear as the description proceeds, the invention resides in the combination and arrangements of parts, and details of construction hereinafter described and claimed, it being understood that changes in the precise embodiment of the invention herein disclosed, can be made within the scope of what is claimed without departing from the spirit of the invention.

In the drawings accompanying this specification and forming a part thereof the preferred form of my invention is illustrated, in which:

Figure 1 is a view in front elevation of a folding kodak camera with my novel finder carried thereby, Fig. 2 is a fragmentary view in side elevation of the foregoing, Fig. 3 is a cross sectional view taken on the line 3—3 of Fig. 1, Fig. 4 is a sectional view of a somewhat modified form of view finder, Fig. 5 generally illustrates means whereby the finder is limited to a quadrantal motion.

Figure 6:
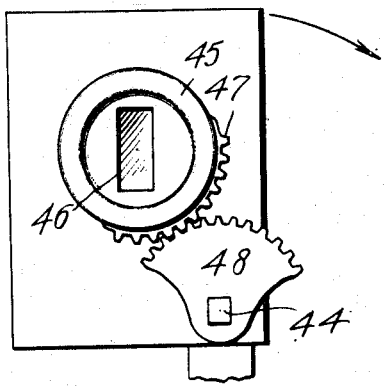
Figs. 6 and 7 are views in front and side elevation of a somewhat further modification.

Referring to the drawings in which similar reference numerals designate corresponding parts throughout the several views, a wall or supporting structure 12 represents the front extremity of a camera and is provided with the aperture 13 extending therethrough for the rotatable support of the view finder F.

The view finder illustrated in Figs. 1 to 3 inclusive represents the sterotype form as used upon photographic cameras and includes the casing 14 in which is supported the reflecting mirror 15 and above which is mounted the eye piece 16. A lens tube 17 projects forwardly from the casing through the aperture 13 and is provided with the externally threaded front extremity 18 to which the cap 19 is secured. An objective lens 20 is mounted within the lens tube 17 and held therein by the holding ring 21 and the view finder as thus constructed is of the usual and ordinary design.

The cap 19 is provided with the disk or screen 22 through which the rectangular aperture 23 extends, the position and extent of which correspond to the rectangular film or plate of the camera. In order to maintain the disk stationary and at the same time not interfere with the partial rotation of the casing the cap is partially unscrewed from the lens tube and is securely locked to the supporting wall 12 by the set screws 24 which threadedly engage the said wall and extend within the notches 25 provided in the cap. The wall aperture 13 is provided with the quadrantal notch or slot 26 in which the lug 27 projecting from the lens tube rides, and thus limits the rotation of the view finder casing to substantially 90°. The relative rotation of the view finder and cap being thus limited to a quadrantal one eliminates all possibility of the cap and lens tube from becoming disengaged or unthreaded.

A spring washer 28 is positioned between and bears against the casing 14 and the wall 12, encompassing the lens tube and provides for the requisite amount of friction accompanying and tending to prevent the movement of the casing. It also takes up the advancement and retraction of the casing with respect to the cap during the partial rotation of the former. Thus the visible field presented by the view finder will correspond both as to size and relative position with the camera plate or film, facilitating the taking of either side or upright pictures.

The somewhat modified form of view finder illustrated in Fig. 4 includes the casing 14', the reflecting mirror 15' and eye piece 16'. A lens tube 29 extends through the aperture 13 in the supporting wall 12 and is non-rotatably secured thereto by the notches 30 in the outstanding flange 31, the said notches being engaged by the set screws 32.

An objective lens 33 is mounted within the lens tube and held so positioned by the spring band 34 which also aids in securing the apertured disk or shutter 35 therein. A second holding band 36 impinges upon the opposite side of the disk and holds the same against rotation and shifting. A locking ring 37 seated or resiliently positioned within the groove 38 holds the various parts in their respective positions within the lens tube. The front wall of the casing is provided with the aperture 39 which rotatably receives the lens tube therein and in connection with the locking nut 40 and resilient washer 41 mounts the casing for its partial and frictional rotation. The visible field thus presented by the view finder will remain fixed in position and correspond in size to the film or plate within the camera.

Figure 8:
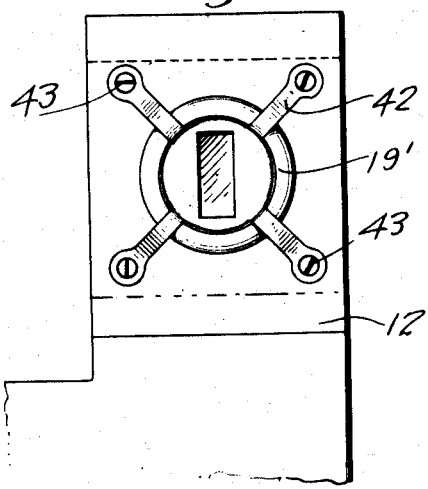
Figs. 8 and 9 are views in front and side elevation illustrating a structure whereby the shutter or apertured disk disclosed in Figs. 1 to 3 inclusive, may be held against rotation, and so arranged as to not interfere with the rotation of the casing cap nut.
Figure 9:
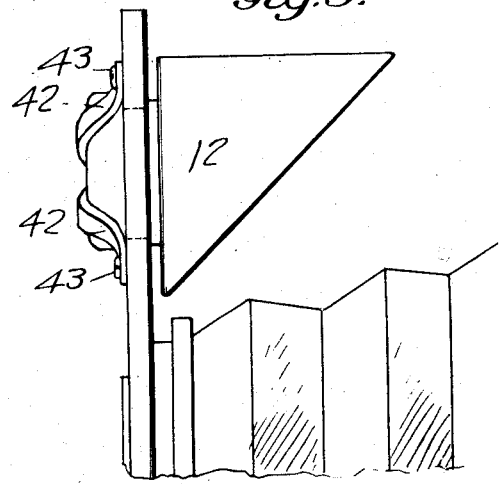
Figure 10:
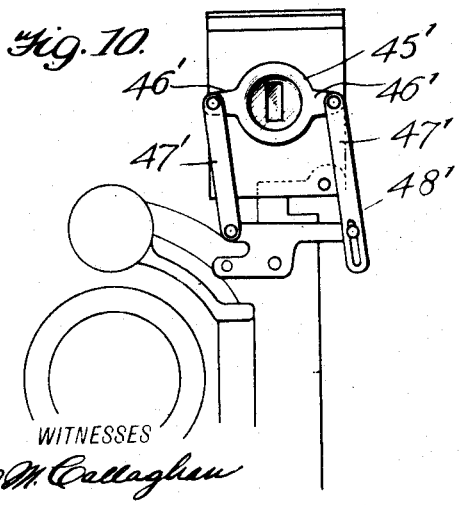
Figs. 10 and 11 represent in front elevation and side section a somewhat further modification wherein the objective lens cell and disk are constricted to translatory motion regardless of the rotatory motion of the view finder proper.

A somewhat modified form of cap and apertured disk of the type illustrated in Figs. 1 to 3 inclusive is disclosed in Figs. 8 and 9 wherein it will be apparent that the cap 19' is provided with a plurality of outstanding projections 42 which are securely anchored, at their extremities to the supporting wall 12 by means of the holding screws 43. The cap as thus constructed properly restricts the visible field of the finder and holds the same in its relatively fixed position.

Figure 7:
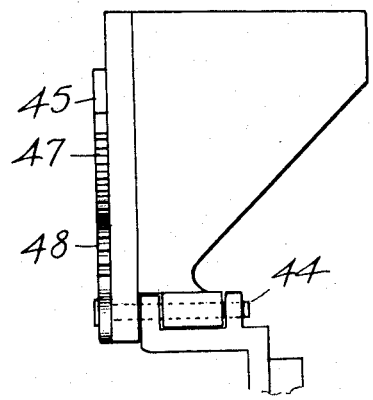

The view finder illustrated in Figs. 6 and 7 is of the type in which the casing is pivoted at one corner about a pin 44 and swings through 90° about this support, thus assuming its several positions by a revolutionary rather than a rotatory motion. This type of finder is used when the supporting wall does not extend to sufficient height or it is not practical to mount the view finder in other ways. A cap 45 or diaphragmed objective such as illustrated in Fig. 4 is rotatably and non-shiftably secured to the view finder and is provided with the rectangular aperture 46 extending therethrough preferably positioned in back of and restricting the field of the finder objective lens. The lens cell is provided with a plurality of gear teeth 47, thus constituting in effect a segmental gear which meshes with the stationary segmental gear 48 carried by the stationary pin 44.

With the parts so arranged, as the view finder is tilted from the position illustrated in Fig. 6 in a direction as indicated by the arrow, the view finder proper revolving through 90°, the objective lens cell will be rotated through 180°, to thus maintain the axis of the aperture parallel with the respective axis of the camera plate or film when in position for use.

Figure 11:
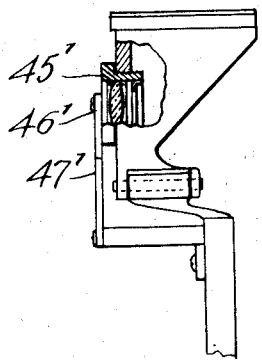

The lens cell illustrated in section in Fig. 11 is similar to that disclosed in Fig. 4 it being noted however that the lock nut 40 is omitted and the casing 14' threadedly engages the lens tube 29. The lens tube is provided with the outstanding ears 46' to which the links 47' are pivotally secured. One of the links is provided with a slot 48' therein, whereby the lens cell will be mounted for substantially parallel or translatory motion but so arranged as to not in any way interfere with the partial rotation of the view finder proper. In this connection it is to be noted that one of the links 47' may be omitted and the same effect obtained should it be so desired.

From the foregoing it will be apparent that with the apertured disk either in front of or directly behind the objective lens it will be positioned approximately at the focus of the eye lens and thus produce a sharp delineation of the picture field the axes of which will always occupy analogous position with respect to the corresponding axes of the picture reproducing portions of the camera.

Having thus fully described my invention what I claim is:—

1. A view finder for cameras comprising an objective lens, a diaphragm adjacent to said lens, the center of the diaphragm being on the optical axis of the objective lens, said lens and said diaphragm being fixed relatively to the camera, a reflector and an eyepiece rotatable as a unit about the optical axis of the objective lens.

2. A view finder for cameras comprising an objective lens, a diaphragm adjacent to said lens and provided with an opening corresponding in shape to the picture reproducing portion, said lens and said diaphragm being fixed relative to the camera, a reflector and an eye-piece rotatable as a unit about the optical axis of the objective lens.

3. A view finder for cameras comprising an objective lens, a diaphragm provided with a rectangular opening disposed adjacent to the objective lens, said lens and said diaphragm being both fixed relatively to the camera, a casing mounted for rotation about the optical axis of the objective lens, a reflector carried by said casing, and an eye-piece carried by said casing and rotatable with the latter.

4. A view finder for cameras comprising an objective lens, a diaphragm provided with a rectangular opening disposed adjacent to the objective lens, said lens and said diaphragm being both fixed relatively to the camera, a casing mounted for rotation about the optical axis of the objective lens, a reflector carried by said casing, and an eye-piece carried by said casing and rotatable with the latter, said reflector being disposed at an angle of 45 degrees with respect to the axis of the objective lens.

5. A view finder for cameras comprising an objective lens, a diaphragm provided with a rectangular opening disposed adjacent to the objective lens, said lens and said diaphragm being both fixed relatively to the camera, a casing mounted for rotation about the optical axis of the objective lens, a reflector carried by said casing, and an eye-piece carried by said casing and rotatable with the latter, said reflector being disposed at an angle of 45 degrees with respect to the axis of the objective lens, and the axis of said eye-piece being at right angles to the axis of the objective lens in any position of the casing.

6. A view finder for cameras comprising an objective lens, a diaphragm provided with a rectangular opening disposed adjacent to the objective lens, said lens and said diaphragm being both fixed relatively to the camera, a casing mounted for rotation about the optical axis of the objective lens, a reflector carried by said casing, and an eye-piece carried by said casing and rotatable with the latter, said reflector being disposed at an angle of 45 degrees with respect to the axis of the objective lens, and the axis of said eye-piece being at right angles to the axis of the objective lens in any position of the casing, said diaphragm being disposed between said reflector and said objective lens.

7. A view finder comprising a casing having a threaded opening and being provided with an eye lens, a mirror disposed in said casing, an objective lens cell including a tube having a threaded portion disposed in said threaded opening for permitting rotation of the casing relative to said lens cell, an apertured disk carried by said lens cell adjacent to the objective lens, the center of the aperture being on the optical axis of the objective lens, the aperture in said disk corresponding in shape to the picture of the camera, and means for retaining said lens cell in a fixed position relative to the picture reproducing portion of the camera when the casing is partially rotated.

8. A view finder comprising a casing having a threaded opening and being provided with an eye lens, a mirror disposed in said casing, an objective lens cell including a tube having a threaded portion disposed in said threaded opening for permitting the rotation of the casing relative to said lens cell, an apertured disk carried by said lens cell adjacent to the objective lens, the aperture corresponding in shape to the picture of the camera, the center of the aperture being on the optical axis of the objective lens, and means for retaining said lens cell in a fixed position relative to the picture reproducing portion of the camera when the casing is partially rotated and for limiting the rotation of said casing.

9. A view finder comprising a casing having a threaded opening and being provided with an eye lens, a mirror disposed in said casing, an objective lens cell including a tube having a threaded portion disposed in said threaded opening for permitting the rotation of the casing relative to said lens cell, an apertured disk carried by said lens cell adjacent to the objective lens, the aperture corresponding in shape to the picture of the camera, the center of the aperture being on the optical axis of the objective lens, and means for retaining said lens cell in a fixed position relative to the picture reproducing portion of the camera when the casing is partially rotated and for limiting the rotation of said casing, said last-named means comprising a link pivotally secured to a portion of said lens cell and being pivotally connected with a fixed portion of the camera.

10. A view finder comprising a casing having a threaded opening and being provided with an eye lens, a mirror disposed in said casing, an objective lens cell including a tube having a threaded portion disposed in said threaded opening for permitting rotation of the casing relative to said lens cell, an apertured disk carried by said lens cell adjacent to the objective lens, the aperture corresponding in shape to the picture of the camera, the center of the aperture being on the optical axis of the objective lens, and means for retaining said lens cell in a fixed position relative to the picture reproducing portion of the camera when the casing is partially rotated and for limiting the rotation of said casing, said last-named means comprising a link pivotally secured to a portion of said lens cell and being pivotally and slidably connected with a fixed portion of the camera.

11. A view finder having an object lens and a perforated diaphragm adjacent thereto, an eye-piece and a mirror coöperating with the eye-piece and the object lens and rigid with the eye-piece, said eye-piece and mirror being partially rotatable with respect to the diaphragm for the purpose specified.

12. A view finder comprising an eye-piece and a mirror rigidly held with respect to each other in a predetermined relative position, an object lens, means for mounting the eye-piece and mirror to support the mirror in a predetermined angular position with respect to the object lens, while permitting said eye-piece and mirror to rotate about the lens.

13. A view finder for a camera comprising a finder lens, a screen rotatable about the axis of the lens for assuming different positions with different positions of the camera, and a field defining device associated with the finder lens and maintaining a fixed relation with the finder lens when the screen is turned.

FINIS MORRISON BARNEY.

Witnesses:
  EARL E. BLISS,
  D. E. REEVE.